US010007527B2

(12) United States Patent
Fetterman et al.

(10) Patent No.: US 10,007,527 B2
(45) Date of Patent: Jun. 26, 2018

(54) UNIFORM LOAD PROCESSING FOR PARALLEL THREAD SUB-SETS

(75) Inventors: Michael Fetterman, Boxborough, MA (US); Stewart Glenn Carlton, Madison, AL (US); Douglas J. Hahn, Los Altos, CA (US); Rajeshwaran Selvanesan, Milpitas, CA (US); Shirish Gadre, Fremont, CA (US); Steven James Heinrich, Madison, AL (US)

(73) Assignee: NVIDIA CORPORATION, Santa Clara, CA (US)

( * ) Notice: Subject to any disclaimer, the term of this patent is extended or adjusted under 35 U.S.C. 154(b) by 1070 days.

(21) Appl. No.: 13/412,438

(22) Filed: Mar. 5, 2012

(65) Prior Publication Data

US 2013/0232322 A1 Sep. 5, 2013

(51) Int. Cl.
G06F 15/00 (2006.01)
G06F 7/38 (2006.01)
G06F 9/00 (2006.01)
G06F 9/44 (2018.01)
G06F 9/38 (2018.01)

(52) U.S. Cl.
CPC ............ *G06F 9/3887* (2013.01); *G06F 9/383* (2013.01); *G06F 9/3851* (2013.01)

(58) Field of Classification Search
None
See application file for complete search history.

(56) References Cited

U.S. PATENT DOCUMENTS

| 5,854,638 A | 12/1998 | Tung |
| 2008/0244080 A1* | 10/2008 | James et al. ................. 709/231 |
| 2011/0078358 A1* | 3/2011 | Shebanow ........................ 711/3 |
| 2011/0078406 A1* | 3/2011 | Nickolls et al. .............. 711/202 |

FOREIGN PATENT DOCUMENTS

| CN | 1285694 A | 2/2001 |
| CN | 1731370 A1 | 2/2006 |
| TW | 201120754 A | 6/2011 |

* cited by examiner

*Primary Examiner* — George Giroux
(74) *Attorney, Agent, or Firm* — Artegis Law Group, LLP

(57) ABSTRACT

One embodiment of the present invention sets forth a technique for processing load instructions for parallel threads of a thread group when a sub-set of the parallel threads request the same memory address. The load/store unit determines if the memory addresses for each sub-set of parallel threads match based on one or more uniform patterns. When a match is achieved for at least one of the uniform patterns, the load/store unit transmits a read request to retrieve data for the sub-set of parallel threads. The number of read requests transmitted is reduced compared with performing a separate read request for each thread in the sub-set. A variety of uniform patterns may be defined based on common access patterns present in program instructions. A variety of uniform patterns may also be defined based on interconnect constraints between the load/store unit and the memory when a full crossbar interconnect is not available.

20 Claims, 10 Drawing Sheets

UNIFORM LOAD PROCESSING FOR PARALLEL THREAD SUB-SETS

BACKGROUND OF THE INVENTION

Field of the Invention

The present invention generally relates to parallel processing and, more specifically, to a parallel architecture for accessing uniform data with reduced bandwidth.

Description of the Related Art

In a single-instruction multiple-thread (SIMT) processing environment, threads are organized in groups of P parallel threads called warps that execute the same program. Although the P threads of a thread group execute each instruction of the program in parallel, each thread of a thread group independently executes the instruction using its own data and registers. Each thread of a thread group executes a program instruction sequence sequentially. A common parallel programming pattern involves an instruction sequence including two separate load instructions for loading two units of data and an arithmetic instruction for further processing the two units of data. Consequently, when processing the instruction sequence, the group of P threads issues 2P memory read requests when the load instructions are processed.

Many parallel algorithms, including tiled matrix multiply, image convolution filters, and image motion estimation, can be organized such that for one load instruction in the instruction sequence the corresponding memory address is the same for each thread in the group of P threads. When processing the load instruction, each thread in the group of P threads issues a separate memory read request to retrieve the corresponding unit of data from memory. However, because the memory address provided by each thread to the load instruction is the same across the thread group, each separate memory read request, when processed, causes the retrieval of the same unit of data from memory. In such a case, the memory retrieval bandwidth is wasted unnecessarily for retrieving the same unit of data P times, once for each thread in the group of P threads.

Accordingly, what is needed in the art is method for efficiently processing multiple read requests received from each thread in a group of parallel threads for retrieving the same data from memory.

SUMMARY OF THE INVENTION

A system and method for processing a load instruction for parallel threads of a thread group when a sub-set of the parallel threads request the same memory address may reduce the number of read requests and data that is transmitted to process the load instruction. The load/store unit determines if the memory addresses for each sub-set of parallel threads match based on one or more uniform patterns. When a match is achieved for at least one of the uniform patterns, the load/store unit transmits a read request to retrieve data for the sub-set of parallel threads. The number of read requests that are transmitted is reduced compared with performing a separate read request for each thread in the sub-set. A variety of uniform patterns may be defined based on common access patterns present in program instructions. A variety of uniform patterns may also be defined based on interconnect constraints between the load/store unit and the memory when a full crossbar interconnect is not available.

Various embodiments of a method of the invention for retrieving from memory data associated a load instruction include receiving a first load instruction for parallel execution by each thread in a thread group, where the first load instruction specifies an individual memory address for each respective thread in the thread group. A parallel thread sub-set that includes only a portion of the threads in the thread group is identified. The individual memory addresses, including a first memory address, associated with the portion of the threads included in the parallel thread sub-set are compared based on a uniform pattern to generate a comparison result. When the comparison result indicates that the individual memory addresses of the parallel thread sub-set comply with the uniform pattern a read request is transmitted to the memory to retrieve data stored at the first memory address.

Various embodiments of the invention include a processing subsystem for retrieving memory data associated a load instruction. The processing subsystem comprises a uniform load unit that is configured to receive a first load instruction for parallel execution by each thread in a thread group, where the first load instruction specifies an individual memory address for each respective thread in the thread group. The uniform load unit identifies a parallel thread sub-set that includes only a portion of the threads in the thread group. The uniform load unit compares the individual memory addresses, including a first memory address, associated with the portion of the threads included in the parallel thread sub-set based on a uniform pattern to generate a comparison result. When the uniform load unit determines that the comparison result indicates that the individual memory addresses associated with the parallel thread sub-set comply with the uniform pattern, a load/store unit that is coupled between the uniform load unit and a memory transmits a read request to the memory to retrieve data stored at the first memory address.

One advantage of the disclosed method is that multiple threads requesting a read of the same memory address execute only a single memory read request, thereby conserving memory bandwidth. In addition, because a uniform load is detected by the load/store unit based on one or more uniform patterns, the compiler has the flexibility to indicate that a load instruction may be uniform even when the compiler cannot guarantee that each thread in the thread group will access the same memory address during execution.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
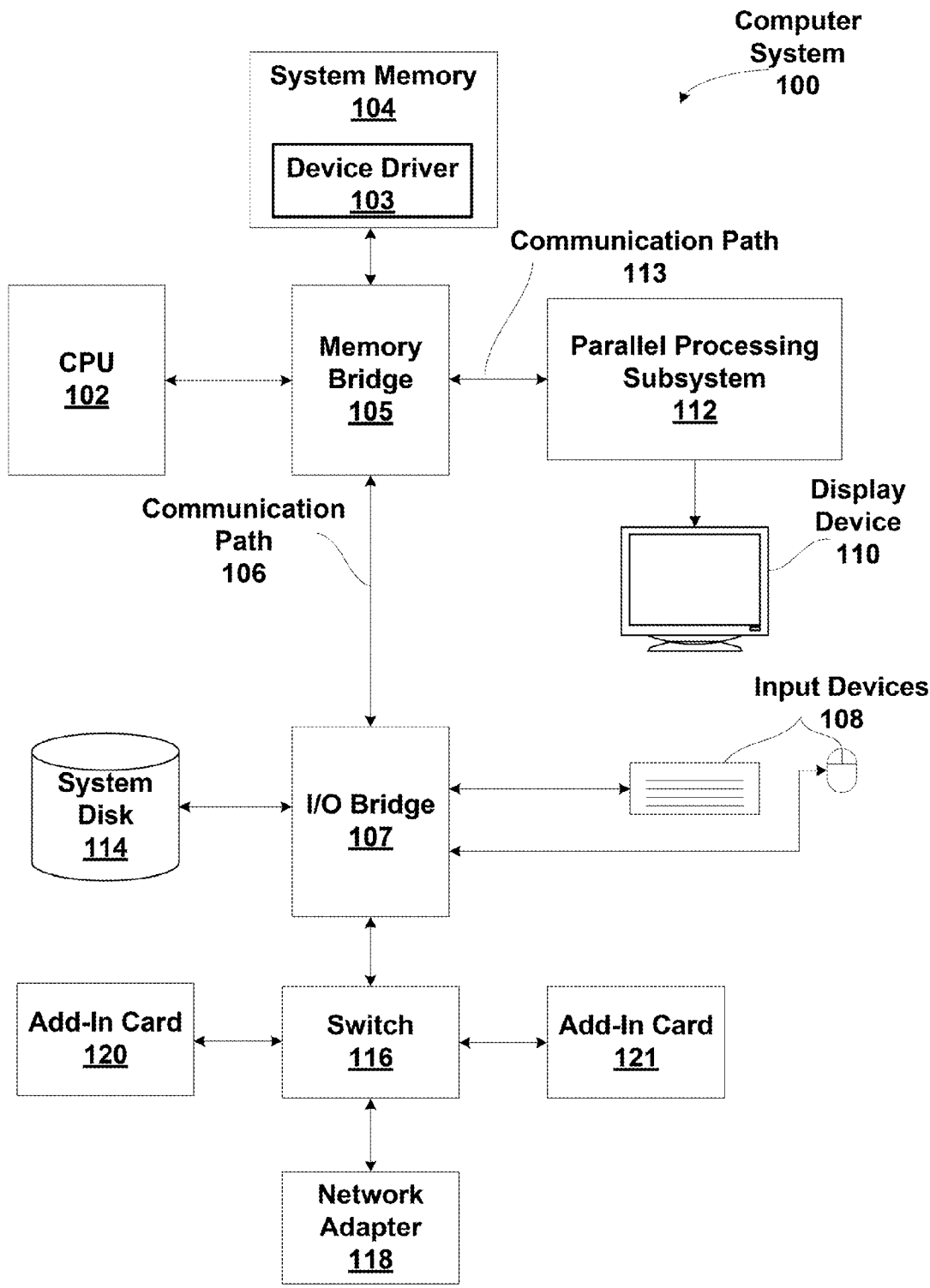
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
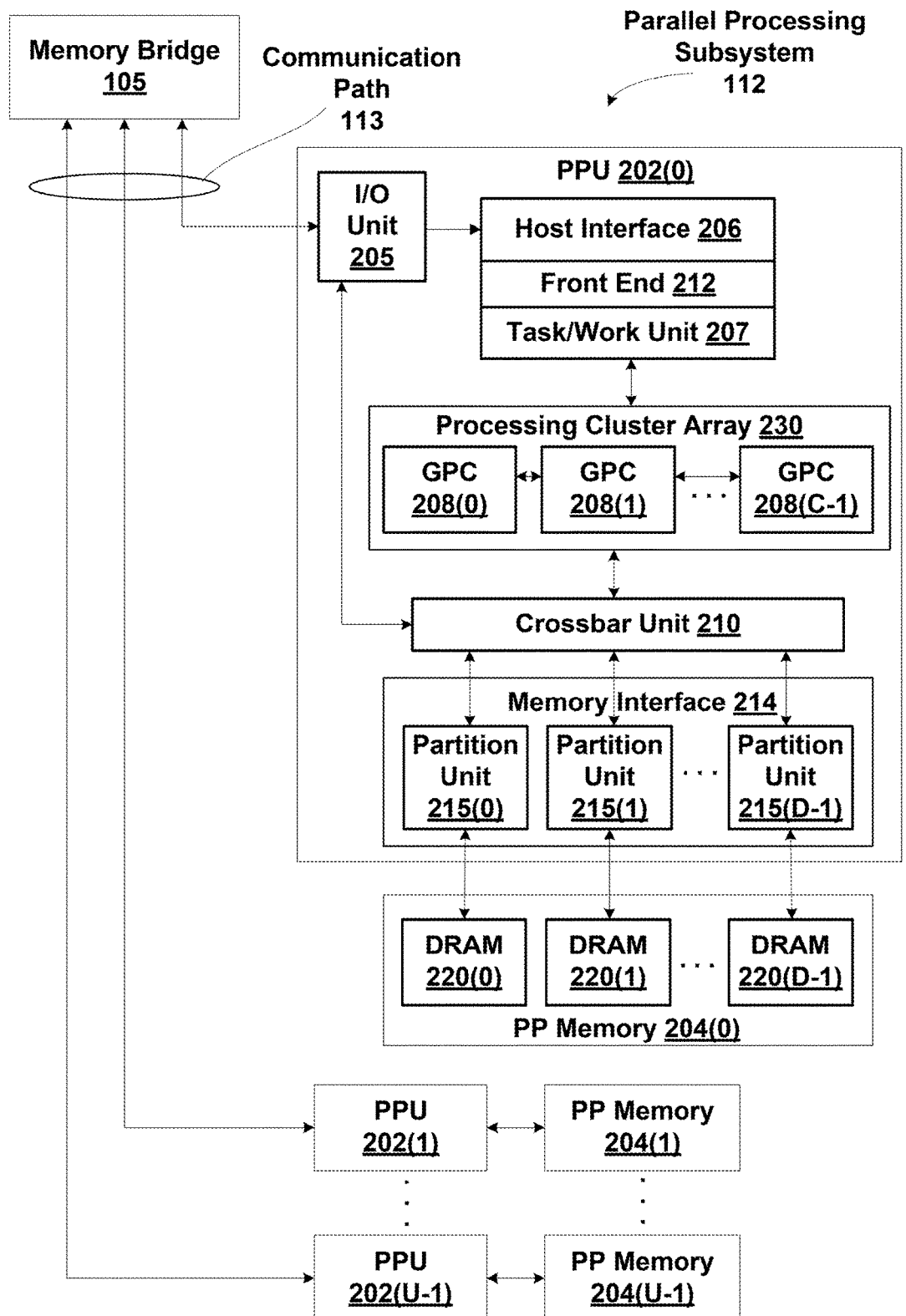
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
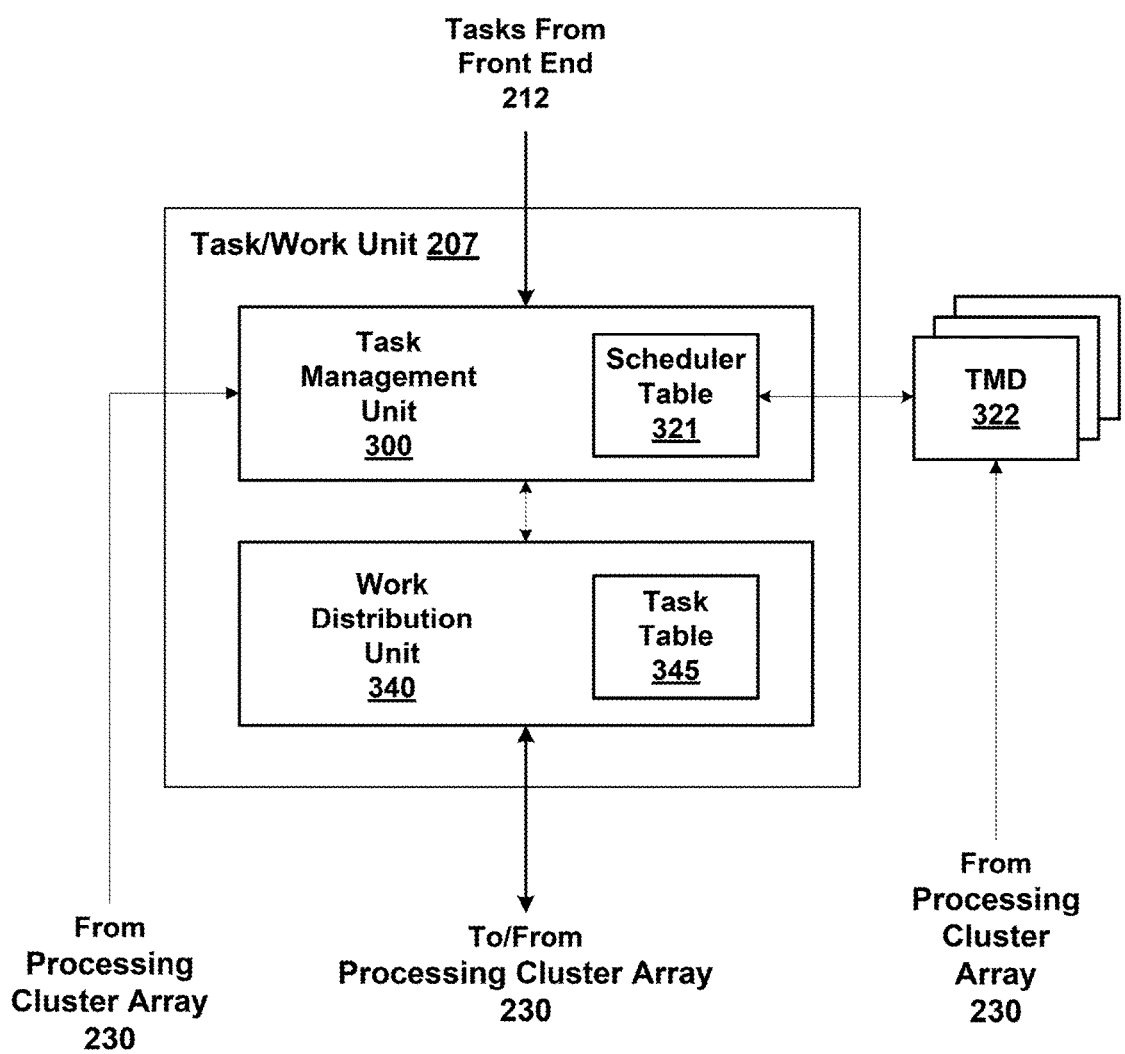
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
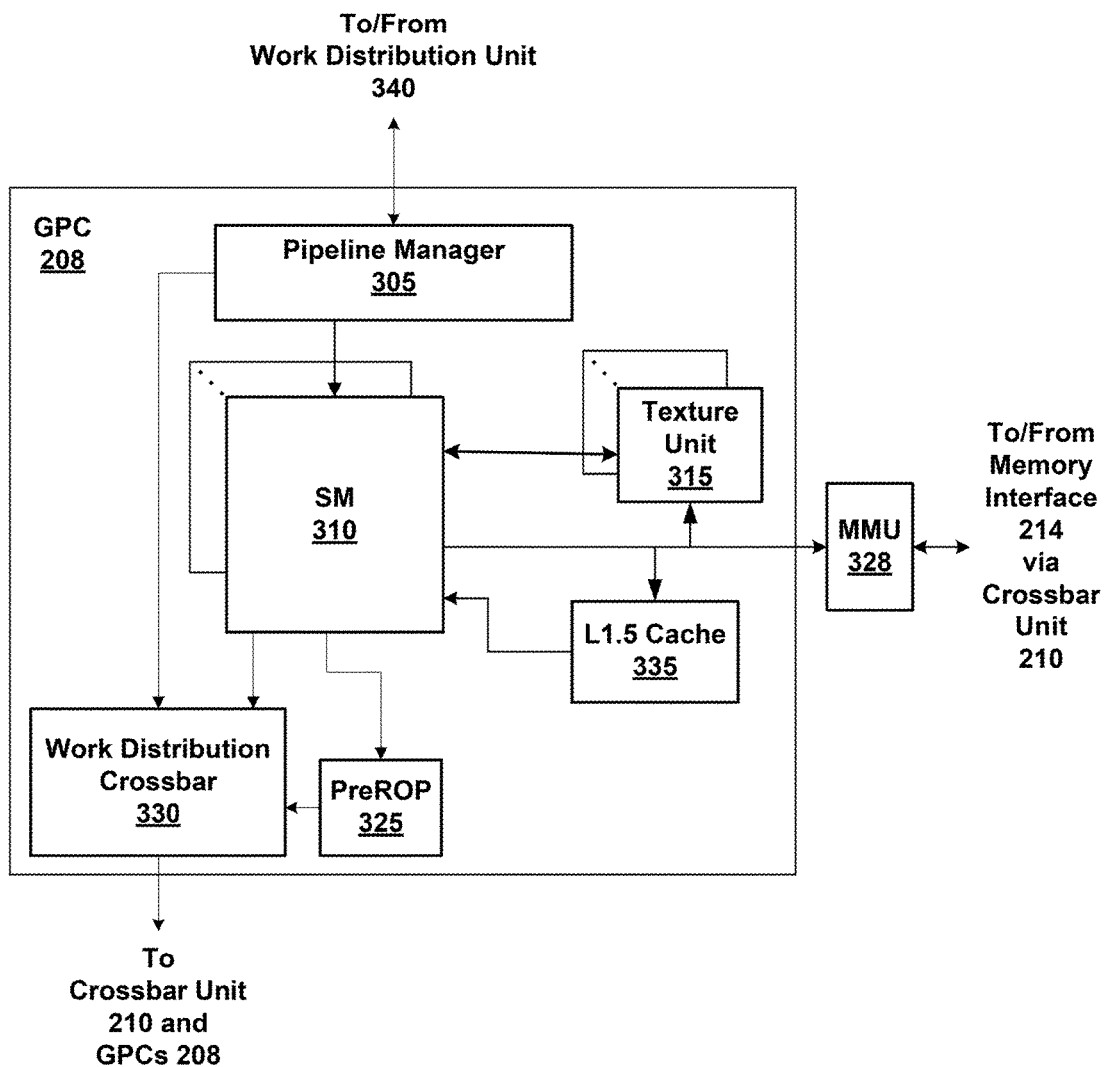
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
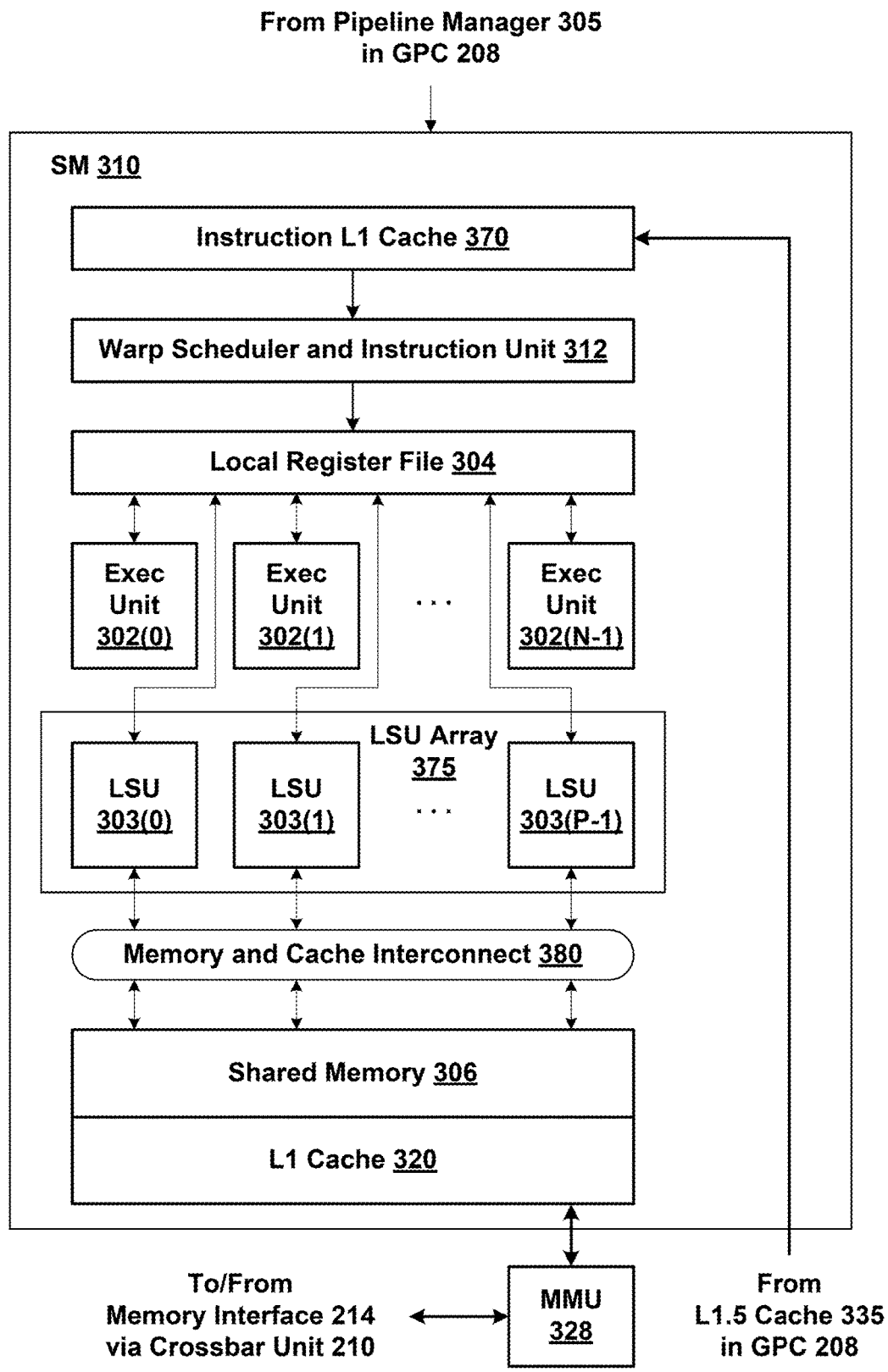
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303 within an LSU array 375.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in the LSU array 375 includes an address generation unit (shown in FIG. 4A) that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

At the application and compiler level, the distinct memory spaces appear within a single unified address space. Therefore, unified memory access instructions are used, instead of separate load and store instructions for each distinct memory space. A C/C++ program may use one unified pointer and one unified access instruction to efficiently access any of the three distinct address spaces. An example load instruction format is: LD.32 Rd, [Ra+offset]; which executes on a group of P parallel threads, and loads each thread's register Rd with 32 bits of data from memory at each unified byte address specified by the sum of each thread's register Ra plus offset. An example store instruction format is: ST.32 [Ra+offset], Rb; which executes on a group of P parallel threads, and stores 32 bits of data from each thread's register Rb to memory at each unified byte address specified by the sum of each thread's register Ra plus offset. More recently, the exec units 302 are configured to process 64 and 128 bit data, so the load and store instructions access read and write, respectively, 64 and 128 bit data.

Processing Uniform Load Instructions for Parallel Thread Sub-Sets

A compiler (not shown) compiles an application program into instructions that are executed by each thread in a single-instruction, multiple-thread (SIMT) environment, such as the parallel processing subsystem 112. During the compilation process, the compiler detects program statements having a high likelihood that multiple threads within a thread group will access the same memory address when executed in the SIMT environment. More specifically, as explained further herein, the compiler detects if a program statement when the memory addresses of the threads in a thread group are likely to match a uniform pattern of memory addresses. For each such program statement, the compiler inserts an indication that the load instruction may be processed as a uniform load instruction instead of a standard load instruction into the compiled application program. An example uniform load instruction format is: LD.U.128 Rd, [Ra+offset]; which executes on a group of P parallel threads, and loads each thread's register Rd with 128 bits of data from memory at each byte address specified by the sum of each thread's register Ra plus offset.

The LD and LD.U variations of the load instructions are equivalent in terms of function. A uniform load instruction LD.U indicates that at least a portion of the P addresses provided by the P threads of a thread group may reference the same memory address or set of memory addresses. It is possible that each thread in a thread group to execute an LD.U instruction references a different memory address, in which case the LD.U will be executed by the LSU array 375 in the same manner as an LD instruction. Importantly, the processing of the LD.U instruction does not require all threads in the thread group to reference a single common memory address. A performance benefit may result when threads in the thread group reference a uniform pattern of memory addresses rather than different memory addresses. An example uniform pattern consists of pairs of threads having the same memory address. The threads in a thread pair are offset by i in the same thread group, where i is an integer less than or equal to P/2. For example, i=1 corresponds to thread pairs of adjacent threads, e.g., thread0 and thread1, . . . thread30 and thread31.

As described in greater detail below, when the LSU array 375 determines that parallel threads in a thread group comply with a uniform pattern of memory addresses for a uniform load instruction, then the uniform load instruction is executed for the sub-set of the parallel threads and, a single memory read request is transmitted to retrieve the data stored at the memory addresses referenced by the parallel threads. The retrieved data is then broadcast to each of the threads referencing the respective memory addresses. The memory bandwidth demands to/from the LSU array 375 is reduced compared with retrieving the same data for multiple threads.

Figure 4A:
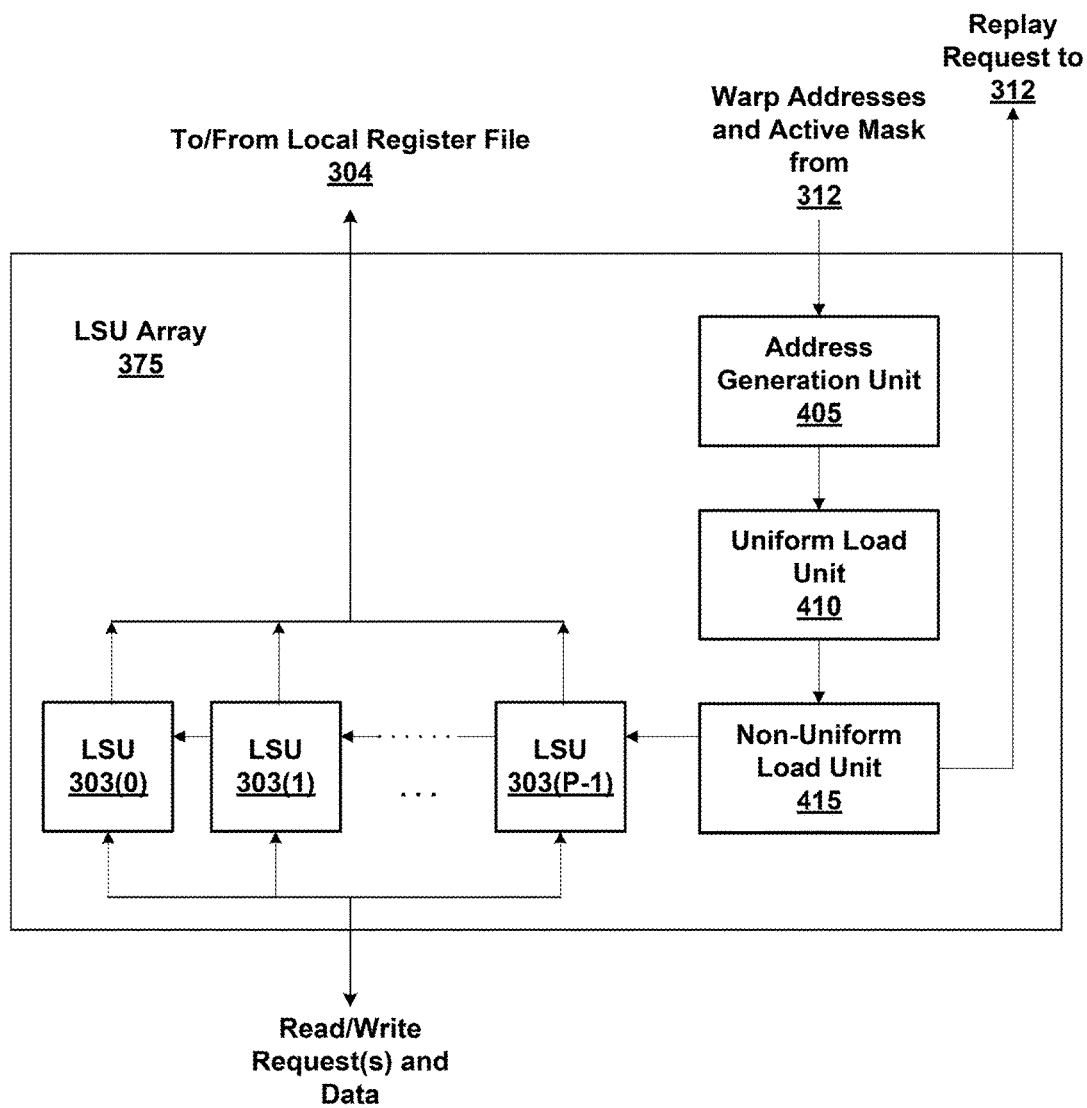
FIG. 4A is a block diagram of the load/store unit (LSU) array of FIG. 3C, according to one embodiment of the present invention.

FIG. 4A is a block diagram of the LSU 375 array of FIG. 3C, according to one embodiment of the present invention. As shown, the LSU array 375 includes the different LSUs 303, an address generation unit 405, a uniform load unit 410, and a non-uniform load unit 415.

In a SIMT architecture, like the one described in FIGS. 3A-3C, a single instruction is broadcasted to a thread group (warp) of P parallel threads along with an active mask for the warp. The active mask indicates which individual threads in a warp are enabled to execute the instruction for the warp. Active threads execute the instruction and non-active threads do not execute the instruction. Threads may become active and non-active when divergence occurs during execution of a program due to branching or the like. Up to P active threads execute the instruction in simultaneously. An arithmetic instruction for P threads is executed by P parallel exec units 302. A memory load/store instruction for P threads is executed by P parallel LSUs 303. A memory instruction for P threads thus gets P addresses, which may be P or fewer different memory addresses.

The address generation unit 405 performs address calculation tasks, e.g., address mapping operations, for the load/store instructions. In one embodiment the address generation unit 405 may be configured to process a request from a warp over multiple cycles, so that a sub-set of the threads are processed during each cycle of the multiple cycles. For example, a sub-set of 8 threads may be processed over 4 cycles when the warp includes 32 threads.

The active mask and the memory addresses for at least a sub-set of the threads in a warp is output by the address generation unit 405 to the uniform load unit 410. When a load instruction is specified as a uniform load instruction, the uniform load unit 410 compares the memory addresses for active threads in each sub-set of the threads to determine if the parallel threads in each sub-set complies with a uniform pattern of memory addresses. The uniform load unit 410 may use one or more different uniform patterns for the comparison. Each uniform pattern may be configured to be separately disabled or enabled for the comparison. Importantly, memory addresses of threads that are not active, according to the active mask, are considered to match any memory address.

When the load instruction is specified as a uniform load instruction and the memory addresses for the active threads in each sub-set of the threads match at least one uniform pattern, then the load instruction may be executed as a uniform load instruction. The uniform load unit 410 outputs each unique memory addresses of the active threads to the non-uniform load unit 415 for processing. Note, that when the load instruction is determined to be a uniform load instruction by the uniform load unit 410, the number of unique memory addresses is at most half compared with a load instruction specifying memory addresses that do not match a uniform pattern (assuming that matching a uniform pattern is not the result of non-active threads). Therefore, the number of read/write requests output by the LSU array 375 may be reduced and the amount of data returned to the LSUs 303 via the memory and cache interconnect 380 is also reduced.

When the load instruction is not specified as a uniform load instruction, the uniform load unit 410 outputs the active mask and the memory addresses through to the non-uniform load unit 415 for processing. The non-uniform load unit 415 transmits each unique memory address referenced by an active thread in the warp to the LSUs 303. The LSUs 303 then transmits a read request including one or more of the unique memory addresses to the memory and cache interconnect 308 to retrieve data for the active parallel threads in the warp. The maximum number of unique memory addresses that are transmitted in a single clock cycle is typically constrained by the memory architecture and the interface between the LSU array 375 and the memory and cache interconnect 308.

In one embodiment, the uniform load unit 410 and non-uniform load unit 415 may be configured to output only the number of unique memory addresses to the LSU 303 that can be transmitted by the LSU 303 as a single read request. When the number of unique memory addresses for a warp is greater than the number, a replay request is output by the non-uniform load unit 415 to the warp scheduler and instruction unit 312. The warp scheduler and instruction unit 312 will then resubmit the load instruction for execution at a later time and reserve additional clock cycles for execution of the load instruction to accommodate the transmission of multiple read requests as needed by the LSUs 303. Any subsequent instructions for the same warp are discarded, or otherwise prevented from being execution, until after the load instruction is replayed and successfully executed by the LSU array 375.

Figure 4B:
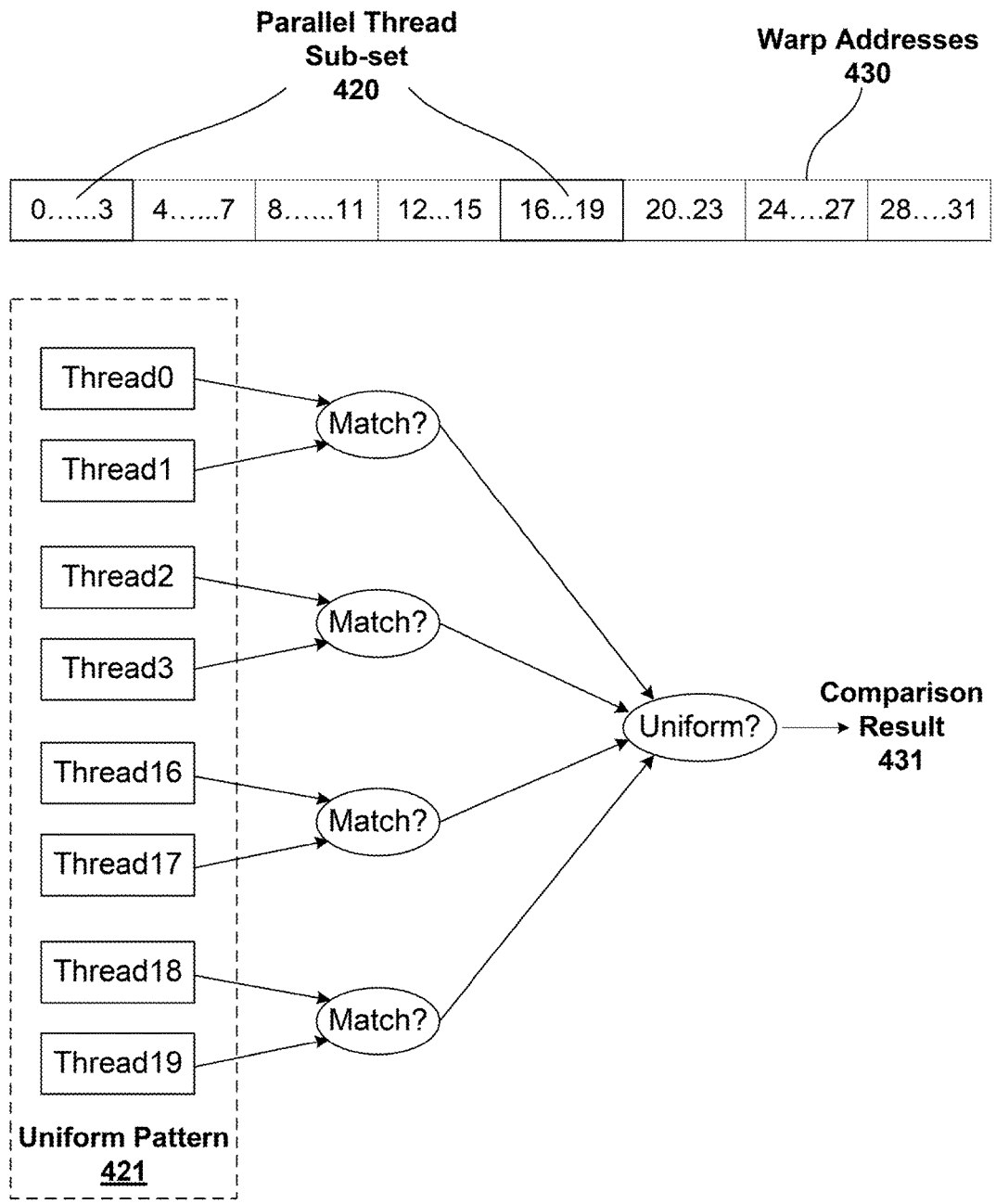
FIG. 4B is a conceptual diagram illustrating a parallel thread sub-set and first uniform pattern that is used to produce a comparison result, according to one embodiment of the present invention.

FIG. 4B is a conceptual diagram illustrating a parallel thread sub-set 420 and first uniform pattern 421 that is used to produce a comparison result 431, according to one embodiment of the present invention. The parallel thread sub-set 420 includes eight parallel threads of a 32 thread warp. The uniform load unit 410 receives the warp addresses 430 and identifies the individual memory addresses associated with the parallel thread sub-set 420. The uniform load unit 410 then compares the individual memory addresses associated with the parallel thread sub-set 420 based on the uniform pattern 421 to generate the comparison result 431. The uniform pattern 421 groups adjacent threads in the parallel thread sub-set 420 for memory address comparison. The threads in each thread pair are defined by the thread index values n and (n XOR 1).

The individual memory addresses of parallel threads with indices 0 and 1, indices 2 and 3, indices 16 and 17, and indices 18 and 19 are compared by the uniform load unit 410 to generate four match results. In other embodiments memory addresses having different indices may be compared. The four match results are then used to generate the comparison result 431. The comparison result 431 indicates whether a uniform load instruction may be used to read data for the parallel thread sub-set 420. Additional second, third, and fourth parallel thread sub-sets may include threads 4 through 7 and threads 20-23, threads 8-11 and threads 24-27, and threads 12-15 and threads 28-31, respectively.

In one embodiment, each thread has the bandwidth to return 64 bits of data which is half of the data needed when 128 bit operations are performed. When threads are paired, one half of the data is returned over the bandwidth reserved for the first thread, the other half of the data is returned over the bandwidth reserved for the second thread. The halves of the data are then shared between the first and second thread within the LSU array 375.

Figure 4C:
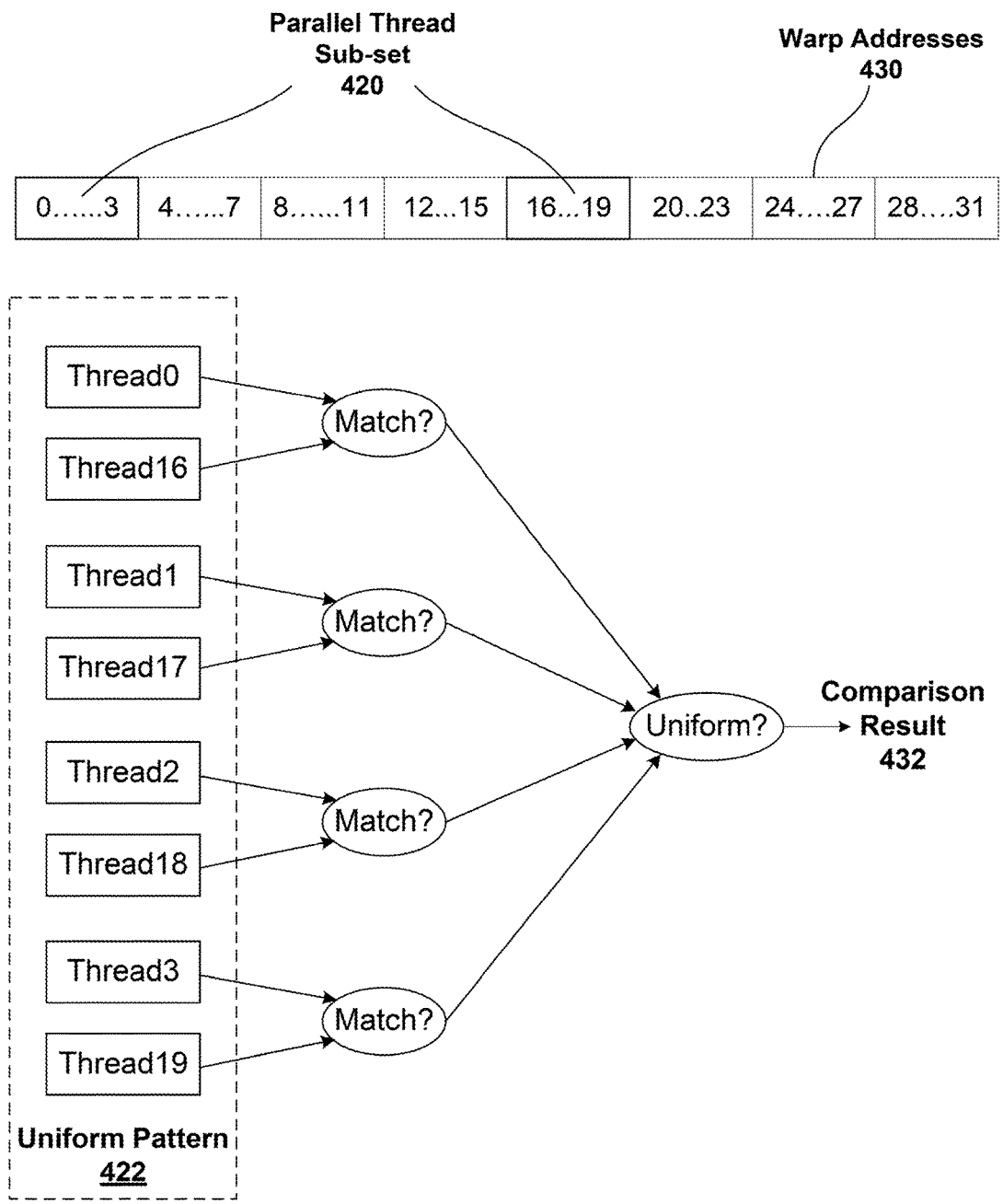
FIG. 4C is another conceptual diagram illustrating a parallel thread sub-set and second uniform pattern that is used to produce a comparison result, according to one embodiment of the present invention.

FIG. 4C is another conceptual diagram illustrating the parallel thread sub-set 420 and second uniform pattern 422 that is used to produce a comparison result 432, according to one embodiment of the present invention. The uniform load unit 410 identifies the individual memory addresses associated with the parallel thread sub-set 420 and then compares the individual memory addresses based on the uniform pattern 422 to generate the comparison result 432. The uniform pattern 422 groups threads having an index that is offset by 16 in the parallel thread sub-set 420 for memory address comparison.

In one embodiment, the warp addresses 430 are received by the uniform load unit 410 over two or more clock cycles, so the two threads in the thread pair are received in the same lane (e.g., the same signals) at cycle t and (t XOR 1). The individual memory addresses of parallel threads with indices 0 and 16, indices 1 and 17, indices 2 and 18, and indices 3 and 19 are compared by the uniform load unit 410 to generate four match results. The four match results are then used to generate the comparison result 432 for the uniform pattern 422. The comparison result 432 indicates whether a uniform load instruction may be used to read data for the parallel thread sub-set 420 based on the uniform pattern 422.

If all the active threads in the parallel thread sub-set 420 comply with either the uniform pattern 421 or the uniform pattern 422, then the load instruction is determined to be a uniform load instruction for at least the parallel thread sub-set 420 by the uniform load unit 410. If the threads in the parallel thread sub-set 420 comply with both the uniform pattern 421 and the uniform pattern 422, then one of the two uniform patterns is selected based on a priority setting. If, however, the threads in the parallel thread sub-set 420 do not comply with any uniform pattern, then the load instruction is processed as a non-uniform load instruction by the non-uniform load unit 415 for the threads in the parallel thread sub-set 420.

In one embodiment, all parallel threads sub-sets within a warp must comply with the same uniform pattern for the load instruction to be processed as a uniform load instruction. In other words, the uniform pattern is applied at the warp level instead of at the thread sub-set level.

Figure 4D:
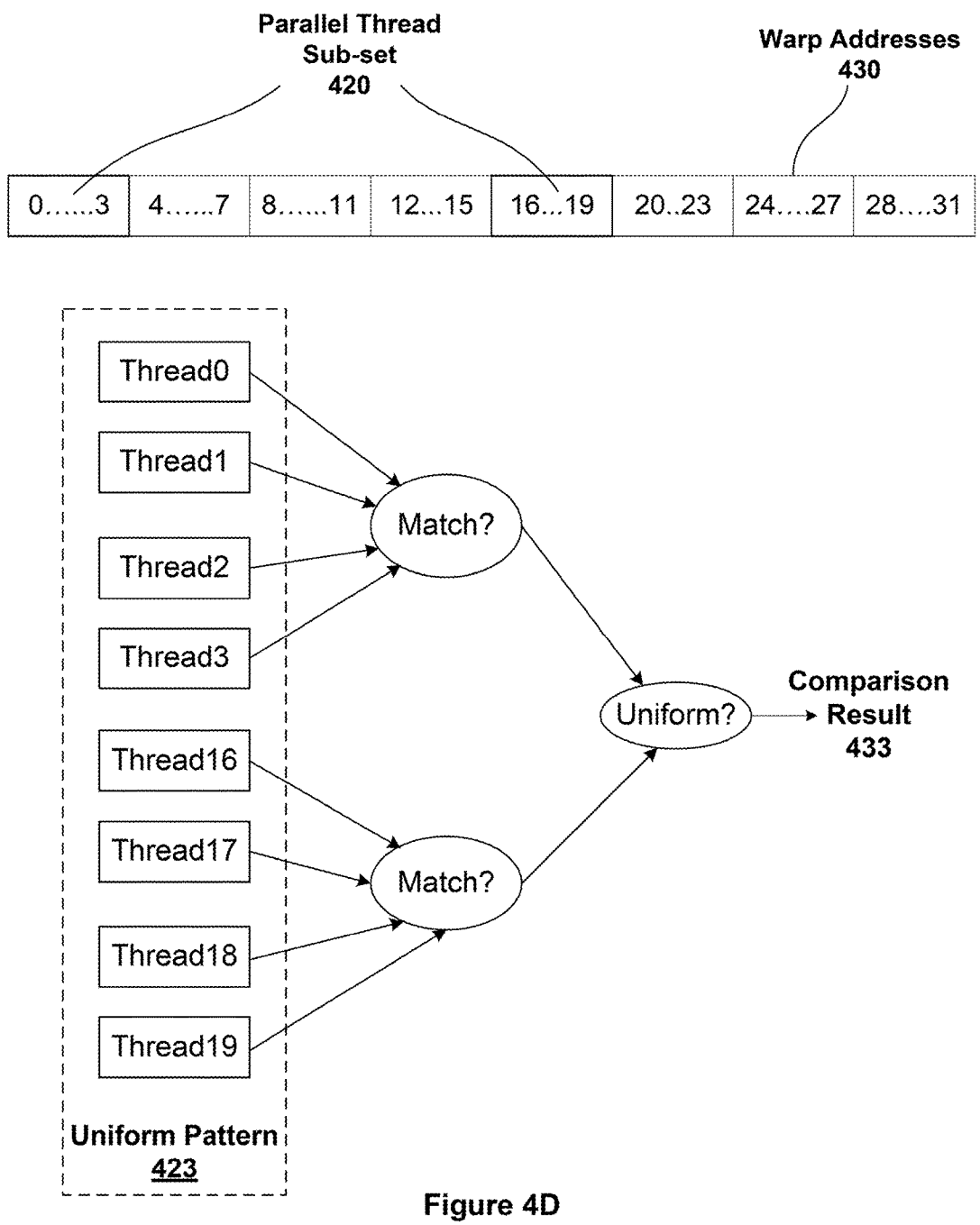
FIG. 4D is another conceptual diagram illustrating a parallel thread sub-set and third uniform pattern that is used to produce a comparison result, according to one embodiment of the present invention.

FIG. 4D is another conceptual diagram illustrating the parallel thread sub-set 420 and third uniform pattern 423 that is used to produce a comparison result 433, according to one embodiment of the present invention. The uniform load unit 410 identifies the individual memory addresses associated with the parallel thread sub-set 420 and then compares the individual memory addresses based on the uniform pattern 423 to generate the comparison result 433. The uniform pattern 423 groups threads having an index that is offset by 1, 2, and 3 in the parallel thread sub-set 420 for memory address comparison. Specifically, the individual memory addresses of parallel threads with indices 0, 1, 2, and 3, indices and indices 16, 17, 18, and 19 are compared by the uniform load unit 410 to generate two match results. The two match results are then used to generate the comparison result 433 for the uniform pattern 423. The comparison result 433 indicates whether a uniform load instruction may be used to read data for the parallel thread sub-set 420 based on the uniform pattern 423. Uniform pattern 423 may be useful for LD.U.128 in an embodiment where each thread has the bandwidth to return 32 bits of data which is one quarter of the data needed when 128 bit operations are performed. Additional uniform patterns may be defined that group the threads of a warp differently for comparing the individual thread memory addresses.

Figure 5:
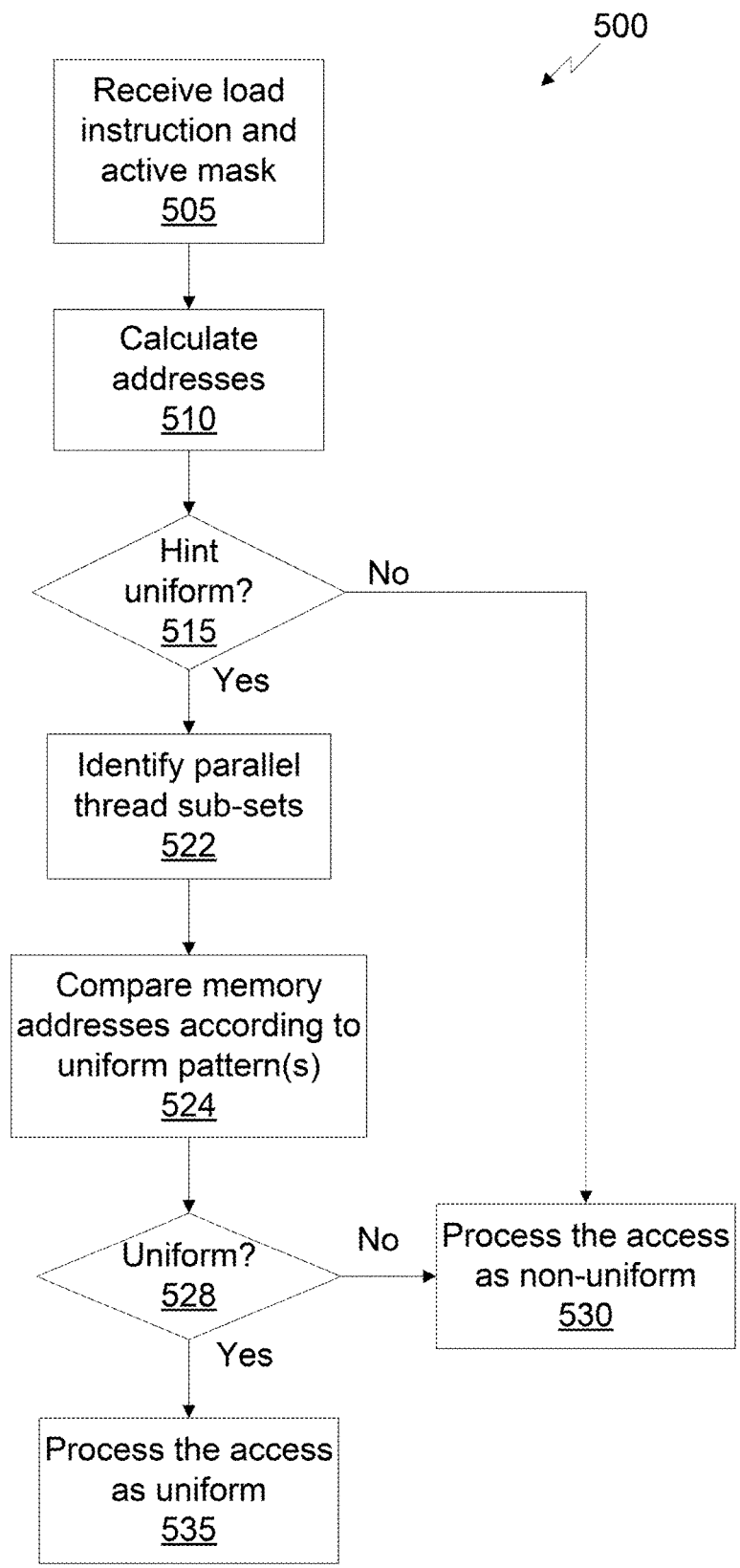
FIG. 5 sets forth a flow diagram of method steps for processing a load instruction, according to one embodiment of the present invention.

FIG. 5 sets forth a flow diagram of method steps for processing a load instruction, according to one embodiment of the present invention. Although the method steps are described in conjunction with the systems of FIGS. 1, 2, 3A, 3B, and 3C, persons of ordinary skill in the art will understand that any system configured to perform the method steps, in any order, is within the scope of the inventions.

The method 500 begins at step 505, where address generation unit 405 receives a load instruction including addresses for at least a portion of a warp and a corresponding active mask for the warp. At step 510 the address generation unit 405 performs address calculation tasks to generate individual memory addresses for each parallel thread. At step 515 the uniform load unit 410 determines if the load instruction is specified as a uniform load instruction, i.e., if a "uniform" hint is included with the instruction. If a "uniform" hint is not included with the load instruction, then at step 530, the non-uniform load unit 415 processes the access as a non-uniform load instruction.

Otherwise, at step 522 the uniform load unit 410 identifies parallel thread sub-sets within the warp. At step 524 the uniform load unit 410 compares the individual memory addresses associated with one or more of the parallel thread sub-sets according to one or more uniform patterns to generate a comparison result for each uniform pattern. The active mask for the warp is also used by the uniform load unit 410 so that non-active threads are considered as matching any individual memory address. The individual memory addresses are not compared for compliance with uniform patterns that are not enabled. At step 528 the uniform load unit 410 determines if the comparison result(s) indicates that the threads within the parallel thread sub-set comply with at least one uniform pattern of memory addresses that includes a first memory address.

If the uniform load unit 410 determines that the comparison results indicate that each parallel thread sub-set does not comply with at least one uniform pattern of memory addresses, then at step 530 the non-uniform load unit 415 processes the load instruction as a non-uniform load instruction. Otherwise, at step 535 the LSU array 375 transmits a read request including the first memory address and any other unique memory addresses for the parallel thread sub-set to the memory and cache interconnect 380 to retrieve the data for the parallel thread sub-set to process the access for the parallel thread sub-set as a uniform load instruction.

One advantage of the disclosed method is that multiple threads requesting a read of the same memory address execute only a single memory read request, thereby conserving memory bandwidth to transmit the request and receive the data. In addition, because a uniform load is detected by the LSU array 375 based on one or more uniform patterns, the compiler has the flexibility to indicate that a load instruction may be uniform even when the compiler cannot guarantee that each thread in the thread group will access the same memory address during execution. The uniform patterns may be defined based on the connectivity (or routing) provided by the memory and cache interconnect 380 between the LSU array 375 and the shared memory 306 and L1 cache 320.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for retrieving from memory data associated with a load instruction, the method comprising:
   receiving a first load instruction for parallel execution by each thread in a thread group, wherein the first load instruction specifies an individual memory address for each respective thread in the thread group;
   identifying a parallel thread sub-set that includes only a portion of the threads in the thread group;
   for each thread included in the parallel thread sub-set, comparing an individual memory address specified in the first load instruction for the thread with at least one other individual memory address specified in the first load instruction for at least one other thread included in the parallel thread sub-set to generate a comparison result;
   determining that the comparison result indicates that the individual memory addresses of the parallel thread sub-set are distributed according to a uniform pattern; and
   upon determining that the comparison results indicate the uniform pattern, transmitting a read request to the memory to retrieve data stored at a first memory address, wherein the first memory address is specified in the first load instruction for at least the thread and the at least one other thread included in the parallel thread sub-set.

2. The method of claim 1, wherein the comparison result indicates that the first load instruction specifies the first memory address for at least two threads within the parallel thread sub-set.

3. The method of claim 1, wherein the comparison result indicates that the first load instruction specifies a second memory address for at least two threads within the parallel thread sub-set, and the read request specifies the first memory address and the second memory address.

4. The method of claim 1, further comprising, prior to the identifying the parallel thread sub-set, determining that the first load instruction specifies a hint that the first load instruction may be processed as a uniform load instruction for the parallel thread sub-set and additional parallel thread sub-sets of the threads in the thread group.

5. The method of claim 1, wherein the comparing comprises comparing individual memory addresses specified by the first load instruction for pairs of adjacent threads within the parallel thread sub-set with each other.

6. The method of claim 1, wherein the comparing comprises comparing individual memory addresses specified by the first load instruction for pairs of threads offset by a predetermined number of threads within the parallel thread sub-set with each other.

7. The method of claim 1, further comprising the steps of:
   receiving an active mask for the thread group that indicates threads in the thread group that should execute the first load instruction; and
   using the active mask to generate the comparison result.

8. The method of claim 1, further comprising the steps of:
   receiving a second load instruction for parallel execution by each thread in a second thread group, wherein the second load instruction specifies an additional individual memory address for each respective thread in the second thread group;
   identifying a second parallel thread sub-set that includes only a portion of the threads in the second thread group;
   for each thread included in the second parallel thread sub-set, comparing an additional individual memory address specified in the second load instruction for the thread with at least one other additional individual memory address specified in the second load instruction for at least one other thread included in the second parallel thread sub-set to generate a second comparison result;

determining that the comparison result indicates that the additional individual memory addresses of the second parallel thread sub-set are not distributed according to the uniform pattern; and transmitting additional read requests to the memory to retrieve data stored at each one of the additional individual memory addresses.

9. The method of claim 1, further comprising the steps of:

identifying a second parallel thread sub-set that includes the remaining threads in the thread group;

for each thread included in the second parallel thread sub-set, comparing an individual memory address specified in the first load instruction for the thread with at least one other individual memory address specified in the first load instruction for at least one other thread included in the second parallel thread sub-set to generate a second comparison result; and determining that the second comparison result indicates that the individual memory addresses of the second parallel thread sub-set are distributed according to the uniform pattern, wherein the read request specifies the first memory address and a second memory address, wherein the second memory address is specified for at least one thread included in the second parallel thread sub-set in the first load instruction.

10. The method of claim 1, further comprising the steps of:

identifying a second parallel thread sub-set that includes the remaining threads in the thread group;

for each thread included in the second parallel thread sub-set, comparing an individual memory address specified in the first load instruction for the thread with at least one other individual memory address specified in the first load instruction for at least one other thread included in the second parallel thread sub-set to generate a second comparison result and a third comparison result;

determining that the second comparison result indicates that the individual memory addresses of the second parallel thread sub-set are not distributed according to the uniform pattern; and determining that the third comparison result indicates that the individual memory addresses of the second parallel thread sub-set are distributed according to a second uniform pattern, wherein the read request specifies the first memory address and a second memory address, wherein the second memory address is specified for at least one thread included in the second parallel thread sub-set in the first load instruction.

11. The method of claim 1, further comprising the steps of:

identifying a second parallel thread sub-set that includes the remaining threads in the thread group;

for each thread included in the second parallel thread sub-set, comparing an individual memory address specified in the first load instruction for the thread with at least one other individual memory address specified in the first load instruction for at least one other thread included in the second parallel thread sub-set to generate a second comparison result;

determining that the second comparison result indicates that the individual memory addresses of the second parallel thread sub-set not distributed according to the uniform pattern; and transmitting additional read requests to the memory to retrieve data stored at the individual memory addresses associated with the remaining threads.

12. A processing subsystem comprising:

a uniform load unit that is configured to:

receive a first load instruction for parallel execution by each thread in a thread group, wherein the first load instruction specifies an individual memory address for each respective thread in the thread group;

identify a parallel thread sub-set that includes only a portion of the threads in the thread group;

for each thread included in the parallel thread sub-set, compare an individual memory address specified in the first load instruction for the thread with at least one other individual memory address specified in the first load instruction for at least one other thread included in the parallel thread sub-set to generate a comparison result;

determine that the comparison result indicates that the individual memory addresses of the parallel thread sub-set are distributed according to a uniform pattern; and a load/store unit coupled between the uniform load unit and a memory and configured to transmit, upon the determination that the comparison results indicate the uniform pattern, a read request to the memory to retrieve data stored at a first memory address, wherein the first memory address is specified in the first load instruction for at least the thread and the at least one other thread included in the parallel thread sub-set.

13. The processing subsystem of claim 12, wherein the comparison result indicates that the first load instruction specifies the first memory address for at least two threads within the parallel thread sub-set.

14. The processing subsystem of claim 12, wherein the comparison result indicates that the first load instruction specifies a second memory address for at least two threads within the parallel thread sub-set, and the read request specifies the first memory address and the second memory address.

15. The processing subsystem of claim 12, wherein the uniform load unit is configured, prior to identifying the parallel thread sub-set, to determine that the first load instruction specifies a hint that the first load instruction may be processed as a uniform load instruction for the parallel thread sub-set and additional parallel thread sub-sets of the threads in the thread group.

16. The processing subsystem of claim 12, wherein the comparing comprises comparing individual memory addresses specified by the first load instruction for pairs of adjacent threads within the parallel thread sub-set with each other.

17. The processing subsystem of claim 12, wherein the comparing comprises comparing individual memory addresses specified by the first load instruction for pairs of threads offset by a predetermined number of threads within the parallel thread sub-set with each other.

18. The processing subsystem of claim 12, wherein the uniform load unit is further configured to:

receive an active mask for the thread group that indicates threads in the thread group that should execute the first load instruction; and use the active mask to generate the comparison result.

19. A computing system, comprising:

a memory that is configured to store data for parallel threads in thread groups; and a processing subsystem comprising:

a uniform load unit that is configured to:

receive a first load instruction for parallel execution by each thread in a thread group, wherein the first load instruction specifies an individual memory address for each respective thread in the thread group;

identify a parallel thread sub-set that includes only a portion of the threads in the thread group;

for each thread included in the parallel thread sub-set, compare an individual memory address specified in the first load instruction for the thread with at least one other individual memory address specified in the first load instruction for at least one other thread included in the parallel thread sub-set to generate a comparison result;

determine that the comparison result indicates that the individual memory addresses of the parallel thread sub-set are distributed according to a uniform pattern; and a load/store unit coupled between the uniform load unit and the memory and configured to transmit, upon the determination that the comparison results indicate the uniform pattern, a read request to the memory to retrieve data stored at a first memory address, wherein the first memory address is specified in the first load instruction for at least the thread and the at least one other thread included in the parallel thread sub-set.

20. The computing system of claim 19, wherein the comparison result indicates that the first load instruction specifies the first memory address for at least two threads within the parallel thread sub-set.

* * * * *